Sept. 8, 1959     C. C. RAYBURN ET AL     2,903,634

PRINTED CAPACITOR

Filed Sept. 22, 1954

INVENTORS
CHARLES C. RAYBURN
HAROLD S. HORIUCHI

BY

Wayne M. Hart
ATTORNEY

United States Patent Office 2,903,634
Patented Sept. 8, 1959

2,903,634

PRINTED CAPACITOR

Charles C. Rayburn, Fairfax County, Va., and Harold S. Horiuchi, Prince Georges County, Md., assignors to ACF Industries, Incorporated, New York, N.Y., a corporation of New Jersey Application September 22, 1954, Serial No. 457,705

1 Claim. (Cl. 317—261)

This invention relates generally to improvements in electrical components and particularly to improvements in stacked mica or ceramic capacitors.

Capacitors of the type comprising laminae of a dielectric coated on each face with a film of metal, are not original herewith. Presently available as staple articles or commodities of commerce are capacitors formed of ceramic discs on which are films of conductive material, usually a noble metal. Size and dielectric strength provide a ceiling on the capacitor value which may be made by this technique. Accordingly, the logical step was to stack two or more discs to increase the capacitance of a single unit. In so doing the problem of connecting leads to the stacked assembly presented itself, and the question of series and parallel arrangements of individual capacitors in a single unit was solved in order to form capacitors with high versatility.

An object of the present invention is to provide a stacked capacitor with a novel arrangement of electrode areas, terminals and conductive strips joining the electrode areas with the terminals. The structural arrangement of these parts is such that a number of capacitance arrangements for a pair of capacitor discs are possible by merely rotating the discs with respect to each other to a number of predetermined positions and fixing the pair of discs in the desired position. The sole adjustment for obtaining the described versatility is the selection of positions of the two discs with respect to each other, and this selection is limited to rotative movement.

Another object of the invention is to provide a condenser comprising a wafer of quadrilateral configuration having an area of metal formed on each respective side thereof and a metallic terminal fashioned in each corner. Conductive paths are depended upon to interconnect respective metallic areas and selected terminals.

An additional object of the invention is to provide a condenser comprising a mounting plate with a plurality of relatively thin metal coated wafers stacked thereon.

In summary, the invention provides a stacked capacitor assembly having preferably two flat ceramic discs, each being four-sided and having upper and lower surfaces on which there are deposited electrodes and having terminals at each corner, on each capacitor disc there being on one side a conductive strip leading from one corner terminal to the electrodes, and on the other side an electrically conductive strip leading from the next adjacent terminal to the electrode. The disc, so constructed may be mounted on the flat insulating base. Inasmuch as the square discs are to be stacked, an electrode of each disc will be common and need not be joined other than by means of physical contact. By the particular structural arrangement of electrodes and conductive strips and terminals, when the discs are rotated with respect to each other to the various positions, different configurations of capacitances, i.e., series or parallel connections therebetween and different connections through the terminals, are available.

Other objects and features of importance will become apparent in following the description of the illustrated forms of the invention.

The use of multiple discs arranged in a stack to form capacitance components has the advantage of affording two or more capacitor assemblies in one unit, whereby the capacitors may be connected in series, or in parallel.

Figure 10:
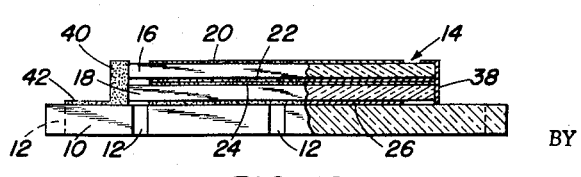
Fig. 10 is an elevational view of a capacitor assembly made in accordance with the principles of the invention, portions being shown in section to better illustrate internal detail, this view having various parts drawn in exaggerated scale.

In obtaining the advantages of a stacked capacitor assembly the instant invention provides a system for very easily obtaining a multiplicity of capacitor arrangements on a convenient mounting base. Initially, attention is invited to Fig. 10 where one structural embodiment of the invention is illustrated. It includes the aforesaid mounting base 10, preferably, but not necessarily, made of a ceramic material. Among the other materials which may be employed are glass, mica, and many of the synthetic resins. Base 10 is flat, four-sided and has twelve notches 12 in the edges. The specific configuration of mounting base 10 is not here material, it being clearly understood that as far as the improvement in the capacitor is concerned, the mounting base could be round, rectangular or some other polygonal shape, with or without notches 12.

The capacitor unit 14 is fixed to the top surface of base 10, and the bottom surface of the base 10 is exposed so that other components such as other condenser assemblies may be supported thereon. Capacitor unit 14 consists of capacitor discs 16 and 18, respectively, the disc 18 being on the upper surface of base 10 while the disc 16 is superimposed upon disc 18. On the upper surface of disc 16 there is an electrode, i.e., an area of electrically conductive material deposited or otherwise connected thereon. This electrically conductive material may assume many forms such as a paint having noble metal particles in suspension, with or without subsequent tinning. On the opposite surface of the disc 16 there is another electrode 22, while on the top surface of disc 18 there is an electrode 24 in contact therewith.

Electrodes 22 and 24 are of similar construction and consist of a film of material containing conductive particles, as silver, gold or other metals. These electrodes need not be tinned or secured together. Being in contact is all that is required. The final electrode 26 is on the bottom surface of disc 18 and bears against the top surface of the mounting base 10.

To hold the capacitor unit 14 in place there are means provided which serve the following functions: they hold the discs 16 and 18 fastened together and maintain electrodes 22 and 24 in firm contact without resorting to other devices; they connect the capacitor unit 14 to its mounting base 10, and they provide electrical terminals for the various electrodes and hence, the capacitors of which they form parts. The means referred to are the terminals 1, 2, 3 and 4 (Fig. 1) located at the four corners of the generally square, stacked capacitor discs. The specific construction of each terminal includes a small metalized coating after which tinning solder is applied and finally connected with terminals on another capacitor disc and to the mounting base 10. Note that the terminals 1, 2, 3 and 4 are applied only to the corners of the capacitor discs and they extend over the edge of each corner.

Figure 1:
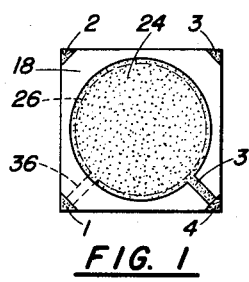
Fig. 1 is a plan view of a typical capacitor disc arranged in a specific orientation and adapted to serve as the bottom disc of a stack made by it and the disc of Fig. 2.
Figure 2:
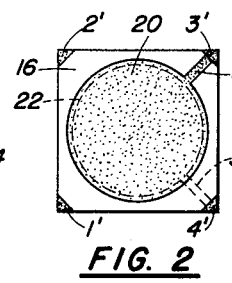
Fig. 2 is a plan view of the capacitor disc which is to be united with the disc of Fig. 1 and arranged in a particular orientation.
Figure 3:
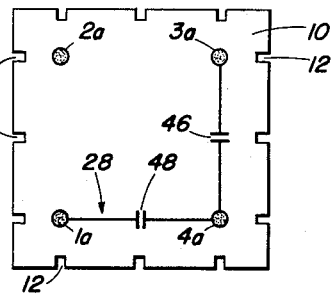
Fig. 3 is a plan view of a mounting plate with a schematic representation of the capacitors when mounted thereon.

Attention is now invited to Figs. 1-3 where capacitor discs 16 and 18 are illustrated. They are in the proper, necessary orientation to produce capacitors of an arrangement schematically shown at 28 in Fig. 3. Electrode 20 is on the top surface of disc 16, while electrode 22 is on the bottom surface thereof. Electrodes 20 and 22 are shown to be of different diameters and shown as circular in form. Neither of these factors are essential. Instead of circular electrodes, other shapes may be resorted to. Circular, though, is preferable for mechanical reasons. The electrodes need not be of different diameters, in fact, it is preferable that they be of approximately the same shape and diameter. Corner terminals 1', 2', 3' and 4' are provided on the capacitor disc 16 and are to be alined with and placed upon the capacitor terminals 1, 2, 3 and 4 when superimposing disc 16 on disc 18. The latter disc illustrates the electrode 24 which confronts electrode 22 in assembly, together with electrode 26 which confronts the upper surface of mounting base 10.

Of great importance to the invention are the conductive strips 30 and 32 of disc 16, and strips 34 and 36 of disc 18. Conductive strip 30 connects the electrode 20 with the conductive terminal 3', while conductive strip 32 connects the electrode 22 with the next adjacent terminal 4'. As seen in Fig. 1, conductive strip 34 connects electrode 24 with terminal 4, and conductive strip 36 connects the electrode 26 with terminal 1. In the disclosed square configuration the geometry of the piece dictates that the lines defining the several conductive strips form an angle of 90 degrees. Each of the conductive strips is made of the same material and in the same manner as the electrodes. Any of the screening, printing, spraying, or other known techniques for depositing conductive material may be used.

On the top surface of base 10 there are four stations, 1a, 2a, 3a and 4a, defined by solder deposits spaced appropriately to accommodate the terminals at the corners of the discs. In assembly, the discs 16 and 18 may be first joined by soldering the terminals together and then the finished unit may be soldered to the mounting base 10. More practical, however, is the procedure where the lower disc 18 is placed with its terminals in registry with the stations 1a, 2a, 3a and 4a, and the disc 16 placed on the top surface of disc 18. Then four solder connections, similar to those shown at 38 and 40 of Fig. 10 serve the three purpose function described previously.

Base 10 has twelve notches 12 in it and each is a potential tie point for the four solder connections at stations 1a, 2a, 3a and 4a. Connections are made to notches 12 by a line, as 42 (Fig. 10) on the top surface of base 10. It is desired that the lines be as short as possible and hence, if it is intended to connect the capacitors of Fig. 3 in parallel, connections, such as those indicated at 42 in Fig. 10 would be made to notches 12 nearest to the corners having stations 1a, 4a, and 3a thereadjacent.

In order to show that the orientation and the condition depicted in Fig. 3 does exist by superimposing discs 16 and 18 as described, it is suggested that the diagram be considered as follows: terminal 3' will be directly over terminal 3 and this will be connected at station 3a. Hence, one end of the internal circuit will be at 3a on base 10 and from there, there will be one-half of the schematically illustrated capacitor 46 in the form of electrode 20. Immediately under electrode 20 (Fig. 2) is electrode 22 and since this is separated from electrode 20 by the dielectric (ceramic disc 16), electrode 22 becomes the other part of schematically shown capacitor 46. Conductive strip 32 leads to terminal 4' which is soldered to terminal 4, which in turn is soldered at station 4a. But, electrode 24 is also connected to terminal 4 by means of conductive strip 34 and therefore, electrodes 24 and 22 are common to whatever is above and below them. This justifies the schematic illustration where station 4a is common to capacitor 46 and to capacitor 48 in that electrode 24 forms one-half of the schematically shown capacitor 48. The other portion is quite apparent now, being electrode 26 on the bottom surface of disc 18 and connected by means of strip 32 to terminal 1. Terminal 1 is connected mechanically, as by soldering, to base 10 at station 1a.

The situation occurs where it is inconvenient to connect to any of the notches 12 near certain corners of the base 10. Therefore, diagram 28 may be rotated clockwise 90° on base 10 by rotating discs 16 and 18 as a unit clockwise on mounting base 10. This same procedure may be repeated to shift the diagram 28, which represents terminal positions as well as capacitor circuit arrangements, 90 or 180° farther.

It is pointed out that rotating the two capacitor discs as a unit with respect to the base 10 does not change the capacitance relation shown at 28, but merely shifts it on base 10. In order to change the capacitor relation disclosed schematically at 28, it is necessary to shift one disc with respect to the other. This is more easily accomplished, either by hand or by machine, by retaining the lowermost disc fixed and revolving the upper disc in steps of 90° depending upon the alteration of capacitance arrangement that is desired.

Figure 4:
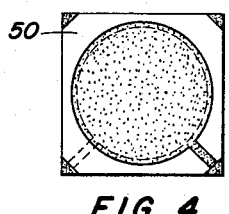
Fig. 4 is a capacitor disc identical in configuration and orientation to that of Fig. 1.
Figure 5:
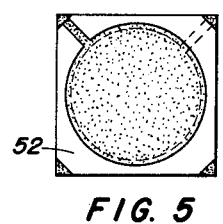
Fig. 5 is a capacitor disc identical in construction to the previously described disc, but in a position different from that of Figs. 1, 2 or 4, the disc of Fig. 5 being adapted to be rested upon and joined to the disc of Fig. 4.
Figure 6:
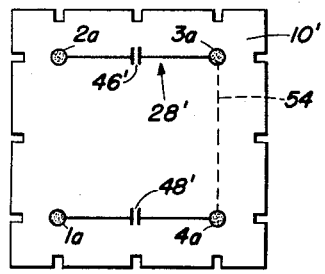
Fig. 6 is a plan view of a mounting plate with a schematic representation of the capacitors of Figures 4 and 5 mounted thereon.

For example, attention is invited first to Figs. 4-6. In Fig. 4 the lower disc 50 is identical in construction and orientation to disc 18. In Fig. 5, capacitor disc 52 is identical in construction, but not orientation, to disc 16. With respect to disc 16 (Fig. 2) disc 52 (Fig. 5) has been revolved 90 degrees counter-clockwise. The result is that the capacitance arrangement on mounting base 10' is altered to that shown at 28', including the capacitors 46' and 48'. For some purposes such a configuration is more desirable than that shown at 28. Capacitors 46' and 48' may be connected in series or in parallel depending on where the leads are applied. This configuration is quite versatile; a series arrangement being shown. The dotted line 54 joining stations 3a and 4a represents the common connection between discs 50 and 52 formed by the inner electrode surfaces being in contact with each other. To provide for a parallel connection of the discs, a conductive line between stations 1a and 2a is all that is required.

Figure 7:
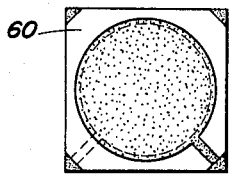
Fig. 7 is a plan view of a capacitor disc identical in construction and orientation to those of Figs. 1 and 4.
Figure 8:
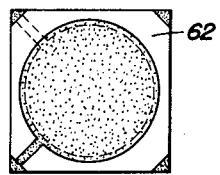
Fig. 8 is another capacitor disc with an orientation different from all others which have been previously described and adapted to be disposed on the top surface of the disc of Fig. 7.

In order to progressively move the system seen at 28' on base 10' clockwise 90 degrees at a time, discs 50 and 52 are rotated 90 degrees as a unit on mounting base 10'. This is the same as was described in connection with Figs. 1-3, and applies also to the capacitor assembly seen in Figs. 7-9.

Figure 9:
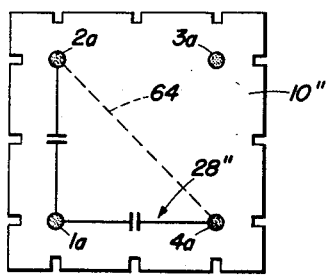
Fig. 9 is a plan view of a mounting insulating base for the capacitors of Figs. 7 and 8 and having a schematic wiring illustration of the capacitances thereon.

The last-mentioned assembly includes the bottom capacitor disc 60, the top capacitor disc 62 and the base 10″. By superimposing capacitor disc 62 upon capacitor disc 60 in the orientation disclosed in Figs. 7 and 8, respectively, the circuit arrangement 28″ is obtained on base 10″ and in the location shown. Connections between stations 2a and 4a of Fig. 9 are made through the common electrodes of the stack and this is indicated schematically at 64.

In review, Fig. 3 shows at 28 a series connection with one common terminal at 4a. Fig. 6 shows a series arrangement with two common terminals 3a and 4a, respectively. Both of these arrangements may be made into parallel circuits by a conductive disc connecting appropriate terminals. The bases 10 and 10′ may be used to support such lines. Fig. 9 shows a parallel circuit internally connected with one terminal at 1a and the other at both 2a and 4a.

Each of the various arrangements and locations on the bases are obtained by stacking two identical capacitor discs. It is significant that the pattern on one surface of the capacitor disc is substantially identical to the pattern on the opposite surface, there being merely a rotational displacement of 90 degrees. The described versatility is attributable in a large part to the single conductive strip for each electrode, as opposed to more than one strip, in combination with another single conductive strip connecting the electrode on the opposite side of the disc with the next adjacent terminal from that which communicates with the only other conductive strip on the disc.

It is understood that certain modifications and changes may be made without departing from the protection afforded by the following claim. For example, the embodiments of the invention are described in connection with two capacitor disc arrangements. It is apparent that more than two discs may be stacked to form various capacitor configurations and values.

What is claimed is:

An electrical assembly comprising a square ceramic mounting plate having four metallic stations thereon, each station being positioned adjacent one corner of the mounting plate, a plurality of similar sized stacked capacitors on said plate, each of said capacitors comprising a square ceramic wafer only of an area defined by the metallic stations on the ceramic mounting plate, a similar circular area of metal formed on the respective upper and lower sides of said wafer removed from the edges of said wafer, a metallic terminal enclosing each corner of said wafer, a first conductive strip extending radially between one of said circular areas of metal and a first terminal, and a second conductive strip extending radially between the other said circular metal area and a second terminal, said second conductive strip being angularly placed 90° from said first conductive strip, and solder connections engaging said terminals to their respective metallic stations.

References Cited in the file of this patent

UNITED STATES PATENTS

| | | |
|---|---|---|
| 2,157,715 | Meggenhoffen | May 9, 1939 |
| 2,437,212 | Schottland | Mar. 2, 1948 |
| 2,608,601 | Boardman | Aug. 26, 1952 |
| 2,752,537 | Wolfe | June 26, 1956 |
| 2,774,014 | Henry | Dec. 11, 1956 |

OTHER REFERENCES

"Project Tinkertoy" Tele-Tech and Electronic Industries, November 1953, pp. 70 and 71.

"Project Tinkertoy," Radio Electronics, December 1953, pp. 59 and 60.